Feb. 23, 1937. G. BROULHIET 2,071,328
FITTING OF FRONT FENDERS, LAMPS, AND RADIATOR UPON A CARRIAGE BODY
Filed Jan. 30, 1933
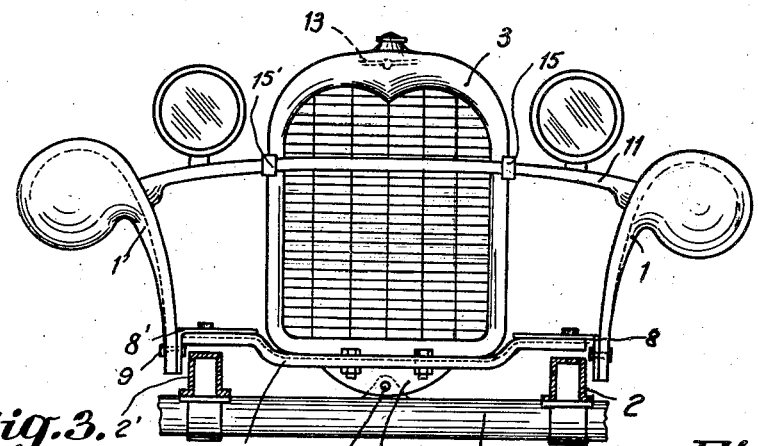
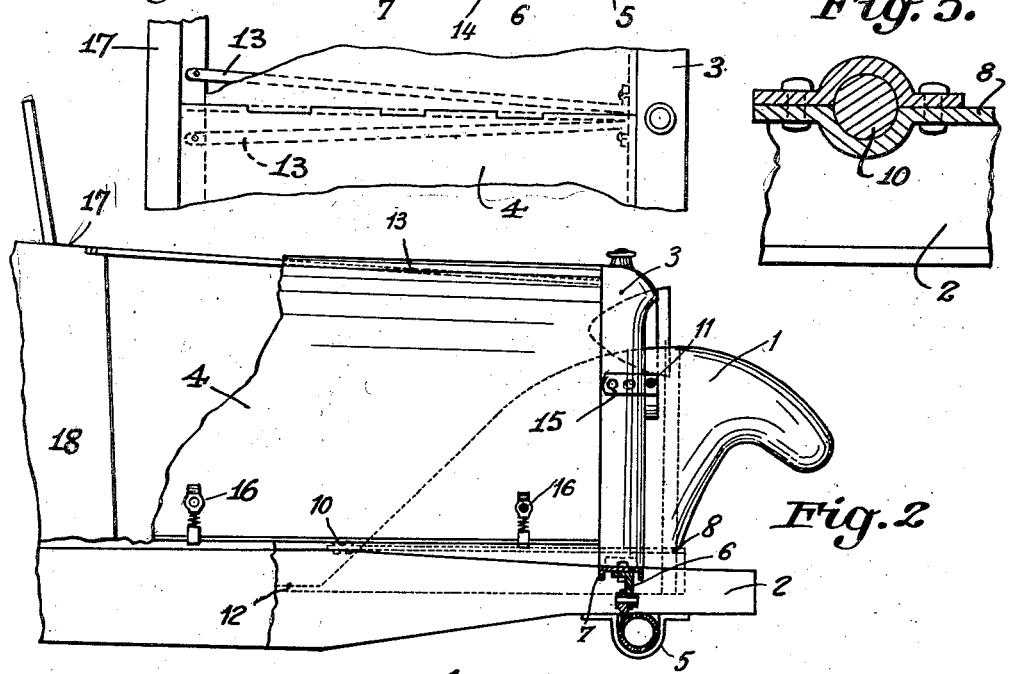
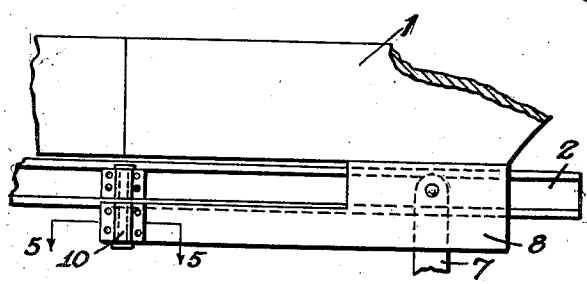

Patented Feb. 23, 1937

2,071,328

UNITED STATES PATENT OFFICE 2,071,328

FITTING OF FRONT FENDERS, LAMPS, AND RADIATOR UPON A CARRIAGE BODY

Georges Broulhiet, Paris, France

Application January 30, 1933, Serial No. 654,293
In Germany February 5, 1932

14 Claims. (Cl. 280—152)

This invention relates to the fitting of the front fenders, the lamps and the radiator upon a vehicle body.

It has for its object to avoid the vibratory and oscillatory movements of the front fenders, of the lamps and of the radiator which are generally produced when the vehicle is running and consequently to increase the comfort and the ease of driving.

The principal object of my invention consists in making the front fenders, the lamps and the radiator unitary with the vehicle body and to preserve them from the vibrations which occur in the front part of the vehicle frame.

It consists essentially in providing a rigid unit constituted by the front fenders, the radiator and the front fenders coupling bar, in making this unit integral with the vehicle body and in pivotally connecting this unit with the vehicle frame.

When a motor vehicle is running on the road the obstructions alternately met by the right front wheel and by the left front wheel tend to create upon the front of the frame an oscillatory movement around the longitudinal axis of said frame, these oscillations being particularly felt in the portion of the frame situated between the radiator and the cowl of the carriage body, the frame being braced and stiffened by said body at the back. In other words, the frame is made relatively stiff by the body up to the cowl, but beyond this point the longitudinal frame members are less rigid. A sudden upward force exerted at the front end of one of the frame members, such as is caused when one of the front wheels strikes an obstacle, will therefore tend to cause bending of the frame member around the point at which it extends beyond the body as a fulcrum. This effect is produced particularly because the weight and inertia of the body tend to cause its other three points of support to remain stationary, and as the front portion of the longitudinal frame member is less rigid, this portion will bend. This bending will tend to distort the fenders and radiator and to cause discomfort and rattling. In classical motor car building the front fenders are secured with as much rigidity as possible between the longitudinal frame members.

Consequently every oscillation of the front portion of the longitudinal members is transmitted to the fenders which are thus caused to vibrate and owing to possible resonances, these vibrations are of a wider range than those which generated them. The head lamps are generally secured upon a cross bar which connects the two front fenders together and therefore take part in the vibratory movements and the displacements of the fenders.

The present invention remedies these inconveniences and it has been observed that even upon the roughest roads the lamps and the radiator remain motionless with respect to the vehicle body.

The appended drawing shows by way of example one mode of execution of the invention.

Fig. 1 is a part front elevation of the front part of a motor car.

Fig. 2 is a part side view.

Fig. 3 is a top plan view of the middle part of the vehicle.

Fig. 4 is a fragmentary plan view of a portion of a fender and the secondary frame.

Fig. 5 is a cross section through the pivot on the line 5—5 of Fig. 4.

Referring now more particularly to the characters of reference in the drawing, the numerals 2, 2' denote the longitudinal members of the vehicle frame and 5 the front cross bar; in the case of a vehicle having independent front wheels this cross bar acts as front axle and is preferably of tubular shape as shown.

A rigid unit is constituted by the two front fenders 1, 1', the radiator 3, the coupling bar 11 and a cross member 7. This unit is connected with the cowl 17 of the vehicle body 18 by means of two oblique ties 13 (Fig. 3) and is thus made integral with the vehicle body provided it is preserved from the vibrations of the front of the frame.

To this end the above described unit is supported upon a small secondary frame which is composed of the cross member 7 and two longitudinal members 8, 8' having an L-shaped section for example. This small secondary frame rests upon the carriage frame at three points only, viz: a pivotal connection having a horizontal axis 14 situated in the middle of the front cross bar 5 and two connecting points 10 between the angle irons 8, 8' and the longitudinal frame members 2, 2'.

The pivotal connection being placed in the middle of the cross bar 5 is therefore perceptibly upon the axis of oscillation that is placed at a point where the oscillatory movements of the frame are not felt.

The two connecting points 10 are advantageously placed near the carriage body cowl; at these points 10 the oscillatory movements of the frame front are not felt as the longitudinal members 2, 2' are stiffened by the carriage body or at least they are considerably reduced; the connecting members 10 are both advantageously pivotal connections. Obviously the free front ends of the longitudinal frame members swing further about the fulcrum at the front of the body than those portions near the body, as this part of the frame member is in the nature of a lever turning about a pivot. Therefore, the points nearer the body vibrate through less distances than the ends, and by securing members 8 to the frame near the body the vibrations to which they are subjected are reduced as compared to what they would be if the fenders were rigidly connected at the front.

The fastenings 16 for the hood 4 are fixed upon the angle irons 8, 8', consequently the hood 4 helps in assembling the unit formed by the fenders 1, 1' the bar 11 and the radiator 3 with the carriage body.

The coupling bar 11 is connected with the radiator shell 3 for example by means of metal fittings 15.

It will be noted that the fender 1 is strongly secured to the angle iron 8 and that the fender 1' is secured to the angle iron 8' by riveting for example and that except at the pivotal points 10 there is no engagement between the fenders 1, 1' on the one hand and the longitudinal members 2, 2' on the other hand.

In the mode of execution shown in Fig. 1 the pivotal connection 14 is provided in a pressed sheet metal part 6 secured to the cross member 7 and to the radiator 3, said cross member 7 and the part 6 could however be omitted and in that case the radiator 3 would be suitably shaped and provided for example with lugs in the middle and on both sides.

Lastly the end of the fenders 1, 1' may be secured at 12 (Fig. 2) against the vehicle steps.

What I claim and desire to secure by Letters Patent of the United States is:

1. In a motor vehicle comprising a chassis frame, a body supported on said frame, a radiator and a pair of front fenders, a secondary frame rigidly supporting the radiator and the fenders, and means for supporting said secondary frame on the chassis including means for attaching said secondary frame to said chassis frame at points of the latter intermediate the body and the radiator where the oscillatory movements of the front part of said chassis frame are considerably reduced.

2. In a motor vehicle comprising a chassis frame, a body supported on said frame, a radiator and a pair of front fenders, a secondary frame rigidly supporting the radiator and the fenders, and means for supporting said secondary frame on the chassis including means for attaching said secondary frame to the longitudinal members of the chassis frame intermediate the body and the radiator.

3. In a motor vehicle comprising a chassis frame having a front cross bar, a body supported on said frame, a radiator and a pair of front fenders, a secondary frame rigidly supporting the radiator and the fenders, and means for attaching said secondary frame to said chassis frame at points of the latter situated near the carriage body and in front thereof, these two frames being, in front of said points, in spaced relation to one another, and being further pivotally connected to one another at a point situated in the middle of the front cross bar of the chassis frame.

4. In a motor vehicle comprising a chassis frame having a front cross bar, a body supported on said frame, a radiator and a pair of front fenders, a secondary frame rigidly supporting the radiator and the fenders, said frame being mounted upon the chassis frame and being connected to the latter at points situated near the carriage body and in front thereof, said two frames being further pivotally connected to one another at a point situated in the middle of the front cross bar of the chassis frame.

5. In a motor vehicle comprising a chassis frame, a body supported on said frame, a cowl on the front part of said body, a radiator and a pair of front fenders, a secondary frame rigidly supporting the radiator and the fenders, means for supporting said secondary frame on the chassis including means for attaching said secondary frame to said chassis frame at points of the latter intermediate the cowl and the radiator, and means for rigidly and directly connecting the radiator to said cowl.

6. An assembly as claimed in claim 1, with head lamps supported rigidly with the fenders.

7. An assembly as claimed in claim 1, with means rigidly connecting the radiator to the fenders, and supporting head lamps.

8. In a motor vehicle comprising a chassis frame having longitudinal members and a front cross bar, a body supported on said frame, a radiator and a pair of front fenders, a secondary frame rigidly supporting the radiator and the fenders whereby the same are connected into a rigid unit, said secondary frame being constituted by two longitudinal members and a front member, and means for attaching the longitudinal members of the secondary frame to the longitudinal members of the chassis frame at points situated near the carriage body and in front thereof, the said front member being pivoted on the front cross bar of the chassis frame, in the middle of the latter.

9. An assembly as claimed in claim 8, and a hood having movable sections, and means for fastening the movable sections to the longitudinal members of the secondary frame.

10. In a motor vehicle, a carriage frame, front fenders, a coupling bar to connect said fenders together, lamps carried upon said coupling bar, a radiator, two metal fittings for assembling together said coupling bar and the radiator shell on either side of the latter, a cowl on the carriage body, two ties for connecting the upper part of the radiator with said cowl, a secondary frame consisting of two longitudinal members and a cross member, the front fenders being secured upon the longitudinal members of said frame and the lower portion of the radiator upon the cross member of the secondary frame, and means for connecting said secondary frame with the carriage frame at points of same which are exposed to oscillatory movements of lesser amplitude than those of the frame front.

11. In a motor vehicle, front fenders, a coupling bar to connect said fenders, lamps carried upon said bar, a radiator, two metal fittings for connecting together said bar and the radiator shell on either side of same, a cowl on the carriage body, two ties to connect said cowl with the top of the radiator, a secondary frame constituted by two longitudinal members and a cross member, the front fenders being secured upon the longitudinal members, and the lower part of the radiator upon the cross member of said secondary frame, a principal frame comprising two longitudinal members and a front cross bar, means for pivotally connecting the cross member of the secondary frame to the middle of the front cross bar of the carriage frame along a horizontal axis, and means to fix the back ends of the longitudinal members of the secondary frame upon the longitudinal members of the carriage frame near the cowl and in front of same.

12. In a motor vehicle, front fenders, a coupling bar to connect said fenders together, lamps supported upon said coupling bar, a radiator, two metal fittings for connecting together said bar and the radiator shell on either side of same, a cowl, two ties designed to connect said cowl with the top of the radiator, a secondary frame, constituted by two longitudinal members and a cross member, the front fenders being secured upon the longitudinal members and the lower part of the radiator upon the cross member of said secondary frame, a principal frame comprising two longitudinal members and a front cross bar, means for pivotally connecting the cross member of the auxiliary frame with the middle of the front cross bar of the carriage frame along a horizontal axis, means to secure the back ends of the longitudinal members of the secondary frame upon the longitudinal members of the principal frame in the vicinity and in front of the cowl, a hood, and means to secure said hood upon the longitudinal members of the secondary frame.

13. In a motor vehicle, the combination with a main frame, of an auxiliary carrier frame comprising longitudinally extending rails and a cross connecting member, said frames being connected so that the auxiliary frame is free from torsional movement of the main frame, and wheel fenders fixed to said carrier frame along substantially their entire length.

14. In a motor vehicle, the combination of a main frame having spaced side sills and a forward cross member, the rear portion of said frame supporting a body, an auxiliary frame having rails and a cross member overlying the side sills and cross member of the main frame, pivoted connections between the ends of the rails and the side sills adjacent the body, supporting means between the cross members allowing relative movement thereof, and front wheel fenders having their inner edges fixed along the rails and supported entirely by the auxiliary frame.

GEORGES BROULHIET.